(12) United States Patent
Gray

(10) Patent No.: US 12,556,498 B2
(45) Date of Patent: *Feb. 17, 2026

(54) COMPUTER-IMPLEMENTED METHOD AND COMPUTING DEVICE FOR EVENT REMINDING AND SENDING RELATED MESSAGES

(71) Applicant: Steven Gray, Saint George, UT (US)

(72) Inventor: Steven Gray, Saint George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,547

(22) Filed: Aug. 21, 2024

(65) Prior Publication Data

US 2025/0379833 A1 Dec. 11, 2025

Related U.S. Application Data

(63) Continuation-in-part of application No. 18/108,813, filed on Feb. 13, 2023, now Pat. No. 12,101,289.

(60) Provisional application No. 63/309,550, filed on Feb. 13, 2022.

(51) Int. Cl.
*G06F 15/16* (2006.01)
*G06Q 10/109* (2023.01)
*H04L 51/02* (2022.01)
*H04L 51/224* (2022.01)
*H04L 67/55* (2022.01)

(52) U.S. Cl.
CPC ........... *H04L 51/02* (2013.01); *G06Q 10/109* (2013.01); *H04L 51/224* (2022.05); *H04L 67/55* (2022.05)

(58) Field of Classification Search
CPC ....... H04L 51/52; H04L 51/046; H04L 51/56; H04L 51/02; H04L 51/224; H04L 67/55; G06Q 10/109; G06Q 10/1093; G06Q 10/1097
USPC ................................ 709/206, 204, 203, 217
See application file for complete search history.

(56) References Cited

U.S. PATENT DOCUMENTS

2014/0324720 A1* 10/2014 Ye .......................... G06Q 10/00 705/319
2017/0099248 A1* 4/2017 Pisenti .................... H04L 51/10

\* cited by examiner

*Primary Examiner* — Kaylee J Huang
(74) *Attorney, Agent, or Firm* — Steven Gray

(57) ABSTRACT

A computer-implemented method, non-transitory computer-readable medium, and computing device for reminding of important events. The method may include, and non-transitory computer-readable medium, and computing device include instruction for, identifying at least one contact associated with a user; creating or importing at least one profile associated with the identified at least one contact; determining at least one calendar date related to at least one event associated with each identified at least one contact; receiving instructions from the user associated with the determined at least one calendar date; sending or not sending, based at least in part on the instructions, a notification to the user; after sending the notification, receiving a signal from the user associated with the push notification; and in response to receiving the signal, automatically generating content for a message. The automatically generated content may be predetermined based at least on the received instructions and editable.

19 Claims, 8 Drawing Sheets

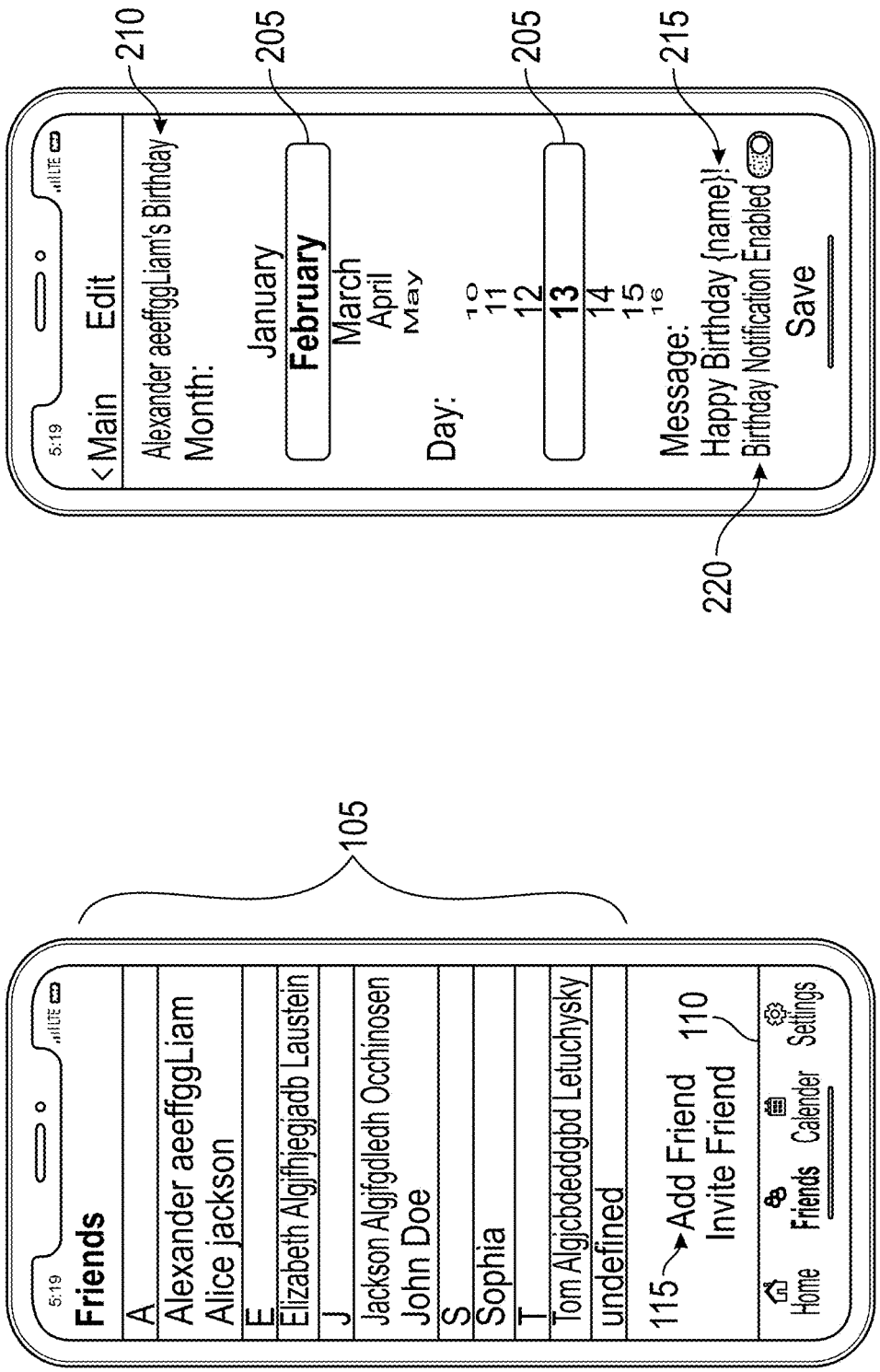

COMPUTER-IMPLEMENTED METHOD AND COMPUTING DEVICE FOR EVENT REMINDING AND SENDING RELATED MESSAGES

CROSS REFERENCE

This application claims priority to U.S. Provisional Application No. 63/309,550, filed on Feb. 13, 2022, and to U.S. Non-Provisional application Ser. No. 18/108,813, filed on Mar. 6, 2018, the contents of which are incorporated herein by this reference as though set forth in their entirety.

FIELD OF INVENTION

A system and/or method relating to the field of managing, organizing, and using information to remember important events and facilitate productive actions related to such events.

BACKGROUND

Many people have trouble remembering birthdays and other important dates (e.g., commemorating important events). Part of the problem is insufficient reminders, and the steps needed to send a message to a person associated with the important date. For example, the important dates may not be written down. Even when they are written down on a calendar or in a notebook, such items may not be looked at frequently, or may not be located close enough to people (who would like to remember the dates/event) on the important dates. As a result, the people do not see the written reminders on the dates of the important events when they most need to.

Even when persons may notice the reminders, they may see them at an inopportune time to do something about them. In addition, (sadly) sending a celebratory message may require just enough work for the sending to be avoided. For example, a person may look at a calendar while in the middle of an important task, and may not be in a good position to send a celebratory message in that moment, which may (for instance) require looking up a contact while driving, or while engaging in work. Regardless of the precise reasons, in such circumstances, and despite good intentions to send the message later, the reminder is often forgotten and/or not acted on.

SUMMARY

Described herein is a computer-implemented method, and a related non-transitory, computer-readable medium, and/or a related device, for reminding of important events. In some examples, the method may include identifying at least one contact associated with a user. In some examples, the method may also include creating or importing at least one profile associated with the identified at least one contact.

In some examples, the method may also include determining at least one calendar date related to at least one event associated with each identified at least one contact. In some examples, the method may also include receiving instructions from the user associated with the determined at least one calendar date.

In some examples, the method may also include sending or not sending, based at least in part on the instructions, a notification to the user. In some embodiments, the notification includes a reminder associated with one event of the at least one event. In some embodiments, the notification includes a push notification to a mobile phone of the user.

In some examples, the method may also include, after sending the notification, receiving a signal from the user associated with the push notification.

In some examples, the method may also include, in response to receiving the signal, automatically generating content for a message. In some embodiments, the automatically generated content is predetermined based at least on the received instructions. In some embodiments, the automatically generated predetermined content is editable by the user.

Also described herein is non-transitory, computer-readable medium for integration of an embedded-process communication. The non-transitory, computer-readable medium has stored thereon executable instructions that, as a result of being executed by one or more processors of a computer system, cause the computer system to perform certain functions or operations.

Also described herein is a device for reminding of important events. The device may include a processor, and a memory in electronic communication with the processor. The memory embodies instructions, the instructions being executable by the processor to perform certain functions or operations.

The executable instructions of the non-transitory, computer-readable medium, as a result of being executed by the one or more processors, and the instructions embodied in the memory of the device, cause the computer system to identify at least one contact associated with a user, and create or import at least one profile associated with the identified at least one contact.

The executable instructions of the non-transitory, computer-readable medium, as a result of being executed by the one or more processors, and the instructions embodied in the memory of the device, cause the computer system or device to determine at least one calendar date related to at least one event associated with each identified at least one contact. In some examples, the executable instructions of the non-transitory, computer-readable medium, as a result of being executed by the one or more processors, and the instructions embodied in the memory of the device, also cause the computer system or device to receive instructions from the user associated with the determined at least one calendar date.

In some examples, the executable instructions of the non-transitory, computer-readable medium, as a result of being executed by the one or more processors, and the instructions embodied in the memory of the device, cause the computer system or device to send or not send, based at least in part on the instructions, a notification to the user. In some embodiments, the notification includes a reminder associated with one event of the at least one event. In some embodiments, the notification includes a push notification to a mobile phone of the user.

In some examples, the executable instructions of the non-transitory, computer-readable medium, as a result of being executed by the one or more processors, and the instructions embodied in the memory of the device, cause the computer system or device to, after sending the notification, receive a signal from the user associated with the push notification.

In some examples, the executable instructions of the non-transitory, computer-readable medium, as a result of being executed by the one or more processors, and the instructions embodied in the memory of the device, cause the computer system or device to, in response to receiving the signal, automatically generate content for a message. In some embodiments, the automatically generated content is predetermined based at least on the received instructions. In some embodiments, the automatically generated predetermined content is editable by the user.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein-including their organization and method of operation-together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components-including those having a dash and a second reference label-apply to other similar components. If only the first reference label is used in the specification, the description is applicable to any one of the similar components having the same first reference label irrespective of the second reference label.

FIG. 1 shows a graphical interface page of a system embodiment in accordance with various aspects of this disclosure;

FIG. 2 shows another graphical interface page of a system embodiment in accordance with various aspects of this disclosure;

DESCRIPTION

Figure 4:
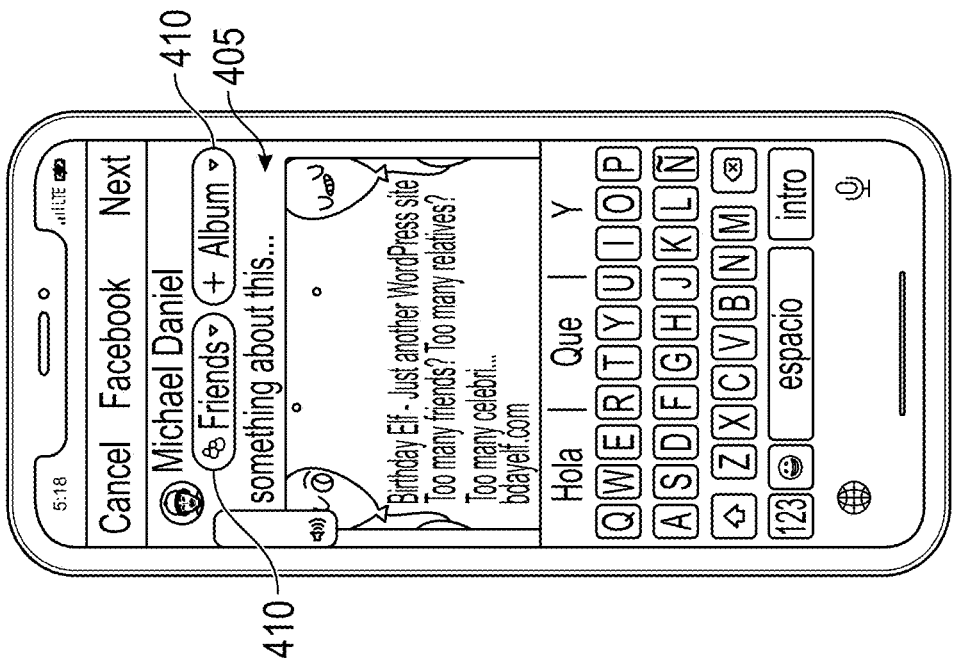
FIG. 4 shows another graphical interface page of a system embodiment in accordance with various aspects of this disclosure.

Files on computers, tablets, and/or mobile devices may provide better options for receiving reminders of important dates. However, not everyone looks to the particular files where such reminders might be stored.

Reminders on electronic calendars such as Google Calendar or Outlook are useful, but also entail drawbacks. For example, some such calendars may be used primarily for work purposes, and thus may not be appropriate for personal use. In addition, once personal reminders are added into the calendars, a person may eventually switch employers, and thus access to the calendars (including to the reminders stored in therein) may be lost. Such electronic calendars may also be cluttered with other information, diminishing the likelihood of the important reminders standing out.

Reminders such as those provided by Facebook for birthdays are also helpful, but not everyone uses particular social media platforms such as Facebook, let alone frequently. Thus, relying purely on Facebook emails to remember birthdays will naturally exclude a cross section of contacts, friends, and family, making important events relating to those persons are even harder to remember. In addition, due to the volume of emails many people receive each day (including from Facebook), many people will ignore such messages, even when they contain important information.

In addition, users may want to wish some Facebook friends happy birthday but not others. Yet such Facebook birthday reminders may be for all Facebook friends, many of whom may not even be casual acquaintances with a particular user. And not having identified/sorted those friends beforehand may render it difficult to do so in the moment, or the day, that a reminder is received by email notifying of all Facebook friends' birthdays. Further, seeing a Facebook email, then clicking on it, logging into Facebook, hitting a notifications tab, clicking on a user's profile, leaving a message, and then repeating the process several times may also be just sufficiently time-consuming as to deter performance of the tasks. As a result, some people may respond to such reminders by sending out birthday messages occasionally but not routinely. Even those social media savvy users who have the tenacity to check their Facebook emails and send out birthday notifications regularly/daily may welcome an easier system.

Relying on Facebook birthday emails may also entail some drawbacks of social medial use generally. For example, some people dread maintaining a social media presence, logging into a cyber world, facing a myriad of notifications, posts, invites, stories, ads, and videos, which may often be presented to users without their selection, and may be generated to capture users' attention for as long as possible. Such use of social media by some may generate stress, anxiety, unhealthy comparisons with others, and even lead to hours of wasted time. Yet on the other hand, neglecting online relationships, and in particular chronically forgetting important dates/events of special people may lead to feelings of guilt and embarrassment.

In addition, while Facebook birthday reminders may apply only for birthdays, there may be other annual dates/events that users wish to remember. Even if remembered, due to the often-hectic activities of daily life, such events may catch a person "flat-footed," leaving it a challenge to take the necessary steps to appropriately celebrate that event by, for example, contacting someone special.

In addition, using some existing platforms, notifications regarding birthdays may be lost in the humdrum of other daily emails, and might not grab a user's attention sufficiently. Similarly, some other platforms may be used by other purposes, lessening the likelihood that a user will think to use such platforms specifically to remember birthdays or other events. Also, platforms that simply remind of such event or birthdays are usually able to also offer users convenient options to also send birthday notifications. In addition, many such platforms may not be offer a user the ability to customize how to be reminded of important events for contacts and friends.

Other platforms feature other drawbacks. For example, some may require long, labor intensive onboarding processes for entering in all the different dates (e.g., many birthdays of friends).

Others applications may be limited in different ways. Some, for example, may notify a user when a contact has a work anniversary and remind the user to congratulate that contact. Some (e.g., local social networks) may also allow local users to create local events and provides reminders and recommendations for upcoming events based on the local user's interests. However, these social networks do not provide, for example: automatic gift and/or social engagement recommendations in advance of or just before events, do not persist in repetitively providing reminders, do not provide reminders for holidays or specialize events such as birthdays for children just becoming teenagers. Yet some more thoughtful consumers want to remember a birthday not just the day of, but also in advance in order to plan something nice for their friend or family member, such as buying a gift, sending a card, or planning a get together.

Existing platforms also do not adequately provide group gift and/or social engagement invitations (such as for members of a social club), or allow purchasing possibilities from multiple purchasing affiliate sites or alternative purchasing sites.

In addition, existing platforms and/or applications may not adequately appreciate or address privacy concerns and issues associated with birth information. For example, some users or contacts of users might not want to have their phone number and/or email and/or birthday being used by others at all through an app or database-even if such info provided by an acquaintance who already has or is otherwise approved to use such info.

Relatedly, some users might not want to share identifying and/or personal information such as a birthday with others, or with anyone that is a contact in their phone, or with groups of people (even if they themselves might want to know that same info from others). And/or, some users may only want certain groups of people—such as family members—to have such information. Similarly, some users are more interested in wishing their family members happy birthday than others, but might not have a simple, non-labor intensive way of gathering such information.

Described herein is a system and/or method that addresses at least some of the aforementioned problems. The system and/or method may not only more effectively remind of important events, such as birthdays, anniversaries, etc., of contacts, friends, family, etc., but may also enable sending messages to special persons more easily and in some cases automatically.

As illustrated in FIG. 1, the system may be configured to perform, and the method may include, creating and/or importing profiles associated with the identified contacts. For example, the system may include a list 105 or database of such contacts. In one embodiment, the system may be kept on a user's mobile device. The contacts may be added/created manually or imported. For example, the contacts may be imported from a user's mobile device's list of contacts. For instance, at the click of a button on a corresponding icon 110, a user may access contacts in a phone and import the selected contacts or profile into the list 105. In this manner, embodiments may involve importing contacts regardless of whether they use social media, or are connected through social media.

In some cases, the contacts in the phone may include other data that may also be imported. For example, a contact in the phone may already include data indicating a birthday for the contact, which can then be automatically imported along with the contact. In some cases, embodiments may automatically detect whether imported data is accurate, and if inaccurate may take steps to correct the data before or after importing. For example, a phone number associated with a contact may inadvertently have been inputted initially as a "home" phone when it is actually a "mobile" phone (or vice versa). That may limit operations intended for mobile numbers but not landlines. In some embodiments, the erroneously indicated "home" phone may be identified as actually, or likely, being a mobile phone, and may consequently be imported as a mobile phone associated with the new profile. (e.g., so that a text message can be sent to a home phone number that should be a mobile number).

In addition, when importing information to facilitate communication with a contact from, e.g., a phone, such information (such as different phone numbers and/or email addresses) may originate from several different sources and in any event be messy. This may result in the existence of multiple contacts of profiles for the same person (e.g., different profiles for an email address and a phone number). This in turn may lead to problems and/or duplicative information and/or extra work when trying to create/import a single profile for a person (e.g., who has both an email address and a phone number associated with separate profiles). Accordingly, some embodiments may involve analyzing such information, and determining that the same contact is associated with different profiles saved in a phone (e.g., corresponding to different phone numbers, or for the same phone numbers and different names, or same person but multiple profiles for a phone number and an email address), and either automatically or upon user confirmation merging such profiles and information for the same person into one profile.

In some embodiments the imported profiles may be saved locally to a user's device (e.g., phone). In this manner, identifying information of a contact may not be shared with third parties. In other embodiments, the imported profiles may be saved onto a database located extraneous to the user device (e.g., in the "cloud"). In some embodiments, prior to a user selecting what contacts from a phone to import as profiles, the phone contacts (e.g., phone numbers) may be compared to contacts or profiles already included in the database. The database may include, for example, users of an application related to aspects of the disclosure. In some embodiments, such users may have been consent for some information such as birthday and contact information (e.g., a phone number and/or an email address) to be shared with other users of the application.

Based on such comparing, a match between one or more phone contacts (e.g., phone numbers) and database contacts and/or profiles may be determined. In such instances, in some embodiments, prior to selecting what phone contacts to import, the user may be presented with a visual indication of such "matched" contacts. If such matched contacts are then selected to be imported, additional data associated with the contacts stored on the database may also be imported. For example, the birthdays of such contacts may be stored on the database and then imported. In some embodiments, a user may choose to automatically import data of all such matched contacts (e.g., in one batch).

In some embodiments, contacts, either prior to or after importing, may be organized into certain classifications or groups. In some embodiments, the classifications or groups may be associated with importing and/or data sharing. In some embodiments, one or groups may include family members. Other groups may include those of a similar organization (e.g., charitable, civic, etc.), or school (e.g., high school or university) or group of friends as the user. Some embodiments may involve importing such groups and related info from external sources and/or databases, such as social media contacts or friends of a user (e.g., by interacting with associated web applications), and/or from family tree databases that include data of living relatives, and/or from other calendar software programs such as Google Calendar. For example, some embodiments may involve users providing permission to determine Facebook, LinkedIn, Instagram, and/or Tiktok contacts/friends or a user and then import related data. For example, such data could allow matching phone contacts, forming groups, and/or importing birthday info (whether for individual contacts/friends associated with the user from such platforms, or for groups to which such contracts/friends pertain).

Such importing contacts and data from existing databases, and/or matched contacts, may speed on an onboarding process and allow users to have access to important event information for more contacts, associates, family members, and friends, in less time, and with less inputting by hand required. Thus, a user can select to import data from members of such groups, or choose to share only with one or more groups, or not share info with particular groups or members thereof. In addition, in some embodiments, a user may organize contacts into such groups. In some examples, such a user may share such groups with other users and invite persons pertaining to or associated with such groups to import each other's data (e.g., birthday information). And/or in some embodiments websites and/or web applications, etc., e.g., associated the aforementioned external sources and or databases, may be granted permission to import data (e.g., birthday information, and/or group information) from a database associated with aspects of the disclosure to use.

Additionally, or alternatively, data associated with such contacts may be stored on the database relating to preferences, such as relating to privacy and permissions. For instance, such privacy and permission preferences may include whether an email can be shared with others who have the contact's phone number in their phones, whether the contacts have provided consent (whether or not required by applicable laws) to receive automated emails and/or text messages from another person based in part on platform embodiments, a preferred mode of receiving a birthday notification (e.g., via text, email, phone call, social media, etc.), or a preferred birthday gift.

As shown in FIG. 2, once a profile is created or imported (or as part of that process), the system may be configured to assign, or the method may include assigning, an event profile to a contact. The event profile may include the name of the individual/contact being imported. The event profile may also include contact information relating to one or more ways of sending notifications to the individual—for example, a phone numbers, an email, a social media handle, etc. Relatedly, the method may include determining a specific date 205 related to an event associated with the identified contact, such as a birthday, and creating an event profile 210 for the contact, wherein each event profile is associated with the determined specific dates.

In addition, the user may pre-draft a message 215 to send to the contact. Such a pre-drafted message may be copied to a clipboard of the user when preparing a message to send to the recipient. For example, predetermined birthday messages may be automatically copied onto a user's clipboard to with the contacts happy birthday. This may save the user time and steps when it is the proper moment for sending the message. In some embodiments, a message may be customized by attaching or incorporating saved images such as photos or memes. In some embodiments, one or several preferred birthday messages may be selected as part of a setup process, which may then automatically be applied as the message 215. In some embodiments, such selected preferred messages may be randomly assigned to different contacts. In some embodiments, the name of a contact may be automatically imported into a pre-selected message without requiring the user to input or type the name.

In some embodiments, the method may also include sending a notification to the user to remind the user to send a message to a contact associated with an event profile. For example, one icon/button 220 of the event profile may be selected so that the user receives the notification, thereby notifying the user of the important events.

The system may be configured for, and/or the method may include, sending notifications reminding the user when the important events are close or are occurring. In some embodiments, a user may select certain preferences associated, for example, with the frequency and time of receiving the notification.

For instance, a user may prefer a particular time of day to receive such notifications when the user is more likely to be able to take actions based on such notifications, such as sending a message to a contact. Another user may prefer to receive such notifications first-thing in the morning. Another user may be mindful of the time zone in which a contact resides, and therefore may want to receive a notification and send a message at a time when the contact is, for example, awake. Thus, in some embodiment a preferred time of receiving the notification may be specific to particular contacts, or groups of contacts (e.g., who live in the same time zone). In some embodiments, users may customize reminders further to receive multiple reminders—e.g., one a week before a birthday, three days before a birthday, and the day of a birthday-however a user chooses. In this way, users may make plans in advance to celebrate important events for others. In some embodiments, a user may also choose to send another contact (or group of contacts) a reminder or message of a third person's event (e.g., birthday).

Events may also be specific to contacts and/or groups of contacts, and/or to contacts of particular nationalities and/or cultures. For example, some contacts may celebrate Chinese New Year, and a user may wish to remember to send celebratory messages to such contacts. Other contacts may celebrate Dia de los Muertos, or Dia del Amigo, or Canadian thanksgiving, or religious holidays, etc., and a user may desire to send celebratory messages to the proper contacts or groups of contacts accordingly. Other events pertaining to groups may include Mother's Day for a mother or groups of mothers, Father's Day for a father or groups of fathers, Valentine's Day, Veteran's Day, etc.

Other preferences relating to receiving notifications may specify receiving more than one notification for a particularly important event. In some embodiment the system may keep track regarding whether the user sends a message (in ways that are explained more fully below) to a contact based on a determined event, for example, in response to receiving a notification. Where no celebrating message has been sent by a predetermined time, the user may choose to receive another notification, or even multiple notifications in a single day until a message is sent.

Figure 3:
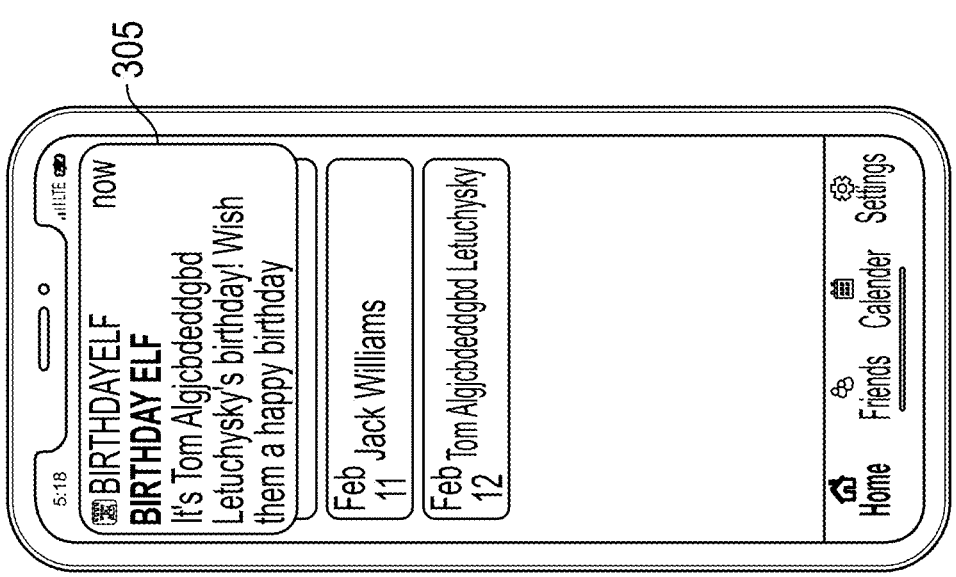
FIG. 3 shows another graphical interface page of a system embodiment in accordance with various aspects of this disclosure.

As shown in FIG. 3, in some embodiments, such notification reminders may include a push notification 305 on a user's personal mobile device. Such push notifications may be clicked by a user, which, as shown in FIG. 4, may bring the user directly to an interface within the system and/or platform (which is some embodiment may include a mobile app), through which the user write and send a message 405 to the contact. In some embodiment the user may paste an automatically drafted message from the clipboard (see e.g., pre-drafted message 215 of FIG. 2). For example, in some embodiments a user may wish a contact happy birthday.

In some embodiments, the sending of a notification may occur directly through social media and/or similar platforms. In some examples, such sending may occur without the user having to take additional steps to log into and navigate through such social media and/or similar platforms. In some embodiments, this may be accomplished by the user using credentials from such social media and/or similar platforms to log-in to or to create an account associated with the system.

Figure 5:
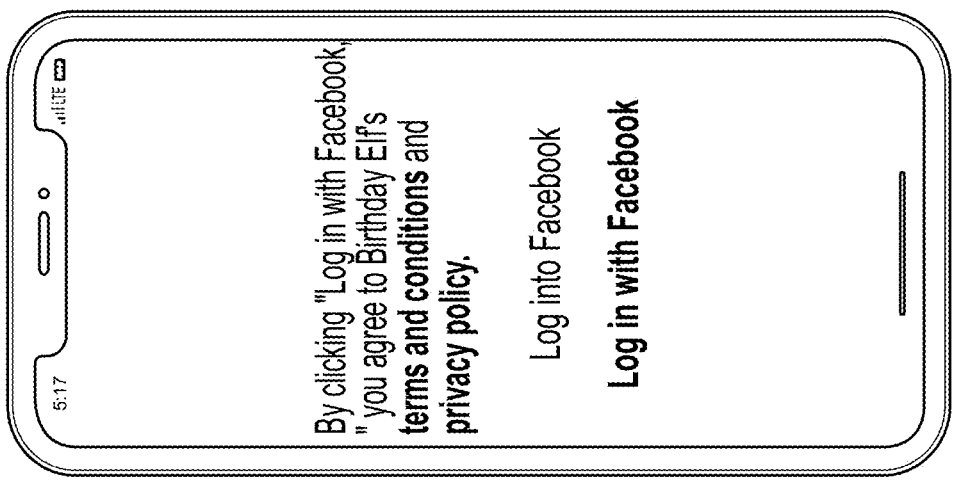
FIG. 5 shows another graphical interface page of a system embodiment in accordance with various aspects of this disclosure.
Figure 7:
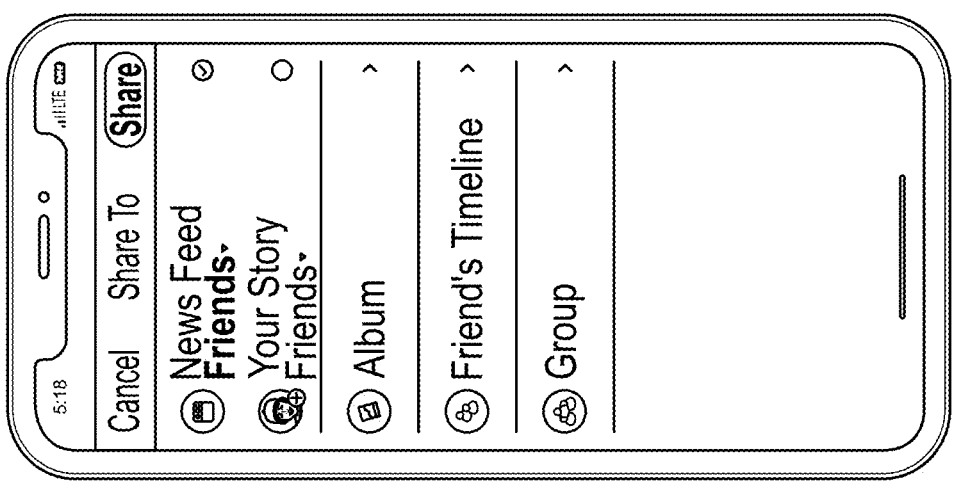
FIG. 7 shows another graphical interface page of a system embodiment in accordance with various aspects of this disclosure.

For example, in some embodiments, such a social media platform may be Facebook, and a user may be asked to log in using Facebook credentials, as shown in FIG. 5. Accordingly, as shown in FIG. 4, a user may send a message such as a birthday wish, which may be directly posted a to a contact's Facebook wall. In some examples, a user may also select 410 who may see the birthday wish and otherwise control aspects of how the message is viewed by others, or by certain groups, etc., as also shown in FIG. 7.

In additional or alternative embodiments, the user may send a message to contact via a text/SMS message or email to the contact. In some embodiments, clicking on the notification (e.g., push notification) may similarly bring the user to screen for sending such a text message and/or an email. In some embodiments, the user may express a preference for what type of message to send to a contact/imported profile (e.g., social media post, text message, and/or email). In some embodiments, clicking on the notification may bring a user to a Facebook notification page, or into a LinkedIn message, or into Instagram where the user can send a photo commemorating a friend's important event (e.g., birthday), etc.

In some examples, celebrating messages may be sent automatically to contacts/imported profiles in a manner specified. For example, a preselected celebrating message may be sent by email to a contact/imported profile automatically, without requiring any additional user action than initial instructions. In some embodiments, in such initial (or subsequent) instructions, the user may indicate that such automatic messages by sent annually, and also instruct that the content of the message change each year. In some embodiments, the user may be also be sent a confirmation (e.g., as a push notification) informing that the celebrating message was sent (e.g., automatically sent), which may also occur automatically without additional user instructions required.

In some examples, in addition to sending message consisting solely of words/text, a user may also draft and send images, photos, GIFs, memes, short videos, etc. Similarly, in addition to pre-drafted message consisting solely of words/text, some pre-drafted messages may also include images, photos, GIFs, memes, short videos, etc. (which in some examples may be preselected by users well in advance of a particular event).

In some embodiments, the system may also be configured for, and/or the system may include purchasing gifts for contacts. For instance, the user may purchase flowers, or foods such as chocolates, etc., to send to a contact. In some such embodiments, in accordance with aspects of the disclosure, notifications may be sent at an early enough date prior to the remembered event, to allow for purchase and delivery of such gifts. For example, a user may choose to receive a first notification two weeks prior to an event, and clicking on the notification may allow the user to order and purchase such gifts. In some embodiments, where a user sends another contact a message reminding of a third person's event (e.g., birthday), the message may include gift ideas, the option to choose gift ideas, and the ability to split expenses for the gifts.

In some embodiments, a contact's profile may also include a delivery address so that the user need enter less information in order to make a purchase and have a delivery scheduled. In some embodiments, the user may also purchase and choose to have sent letters and/or cards to contacts. In some embodiments, such purchases of gifts and/or cards may be fulfilled through third party vendors. In some examples, such vendors may pay a fee to offer their services and goods through the system, or may pay a percentage of purchases through the system.

Figure 6:
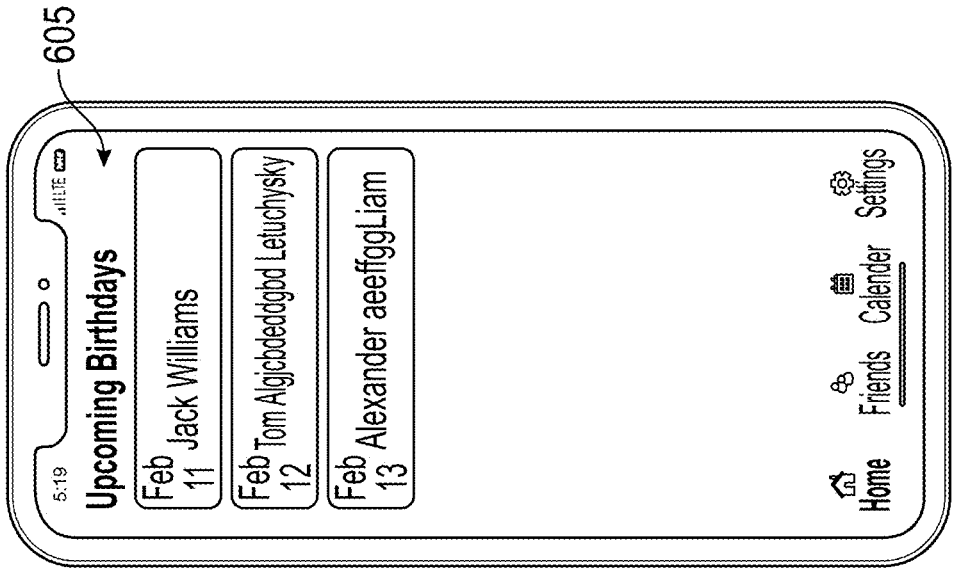
FIG. 6 shows another graphical interface page of a system embodiment in accordance with various aspects of this disclosure.

In some examples, and as shown in FIG. 6, the system and/or method may include a list of upcoming events, such as birthdays 605. In some embodiments, the user may select how may days prior to an event that the contact and associated event will be displayed in the list. For example, a user may select for all birthdays to be shown two days prior and two days after the date of the birthday.

Figure 8:
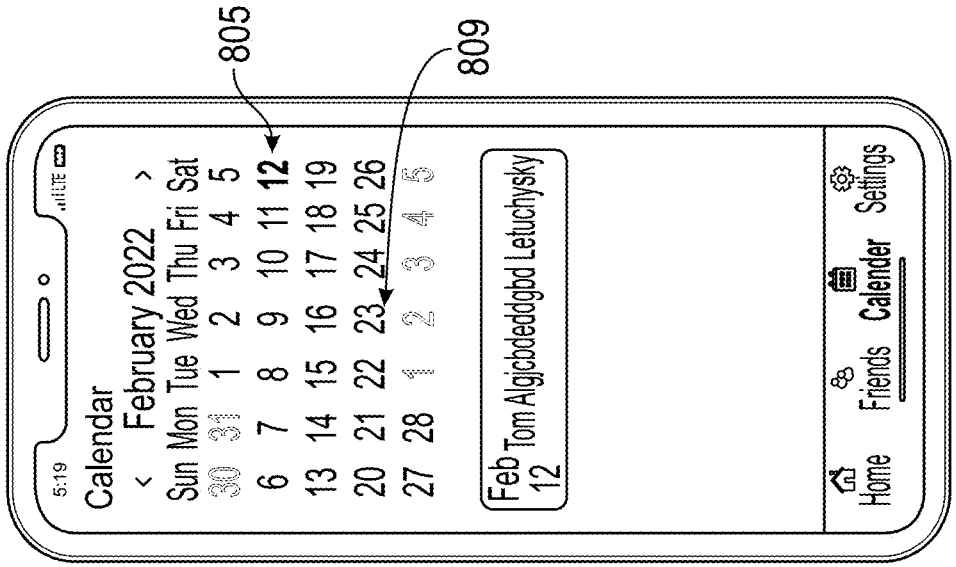
FIG. 8 shows another graphical interface page of a system embodiment in accordance with various aspects of this disclosure.

The system may also include a calendar, an example of which is shown in FIG. 8. In some examples, important events may be marked on dates of the calendar using colors. For instance, a day featuring an event may be shown in green font 805, while a day that does not feature any events may be shown in black font 810.

Some embodiments of the calendar may feature colored icons. In some embodiments, the colors and/or icons may be associated with preset actions (or lack or actions) corresponding to events and contacts. For example, where an event associated with a contact's profile is a birthday that will trigger a notification, a green circle might show underneath the date. On the other hand, a red circle may indicate that the user has chosen not to receive a notification for the event. A different icon, such as a square or a triangle, may indicate a different event, such as an anniversary.

In another aspect, created/imported contacts may be invited to use the system/platform. For example, by clicking on an icon 215 as shown in FIG. 2, a user may be taken to a list of mobile phone contact profiles corresponding to the user's mobile phone database. The user may select which contacts to send a text message or email inviting the contacts to use the system (which may be in some embodiments be a mobile app), which message may include a link and/or instructions for acquiring the system.

In some embodiments, whether when sending an invitation to use the system, or when importing contacts from a mobile phone's database to create event profiles, the system may be configured for, and/or the method may include, identifying contacts where a phone number may have been erroneously stored in the mobile device. For example, as described above, some numbers may have been originally inputted as "home" phone numbers instead of as numbers associated with a mobile device. Some embodiments of the system may not enable full functionality of features (e.g., sending text or SMS messages) unless the phone number associated with an event profile is a mobile phone number. Accordingly, the system may be configured for, and the method may include, prompting a user where such phone numbers may be erroneously labeled in mobile phone's database of contacts.

In some embodiments, if the invitations are accepted by contacts, the created/imported contacts may grant certain permissions to use certain features between the inviting user and the contacts, or between other contacts associated with each other that have registered for the system (e.g., created mobile app accounts), or between all users of the system. For example, in some embodiments, users of the system with particular social media and/or similar platform accounts may grant permission (if such permissions are required) to one another to user the system in connection with the social media and/or similar platform in order to remember important events or send corresponding messages. In some embodiments, for instance, Facebook users may agree to use the system between themselves to leave birthday wishes on walls through Facebook posts.

Figure 9:
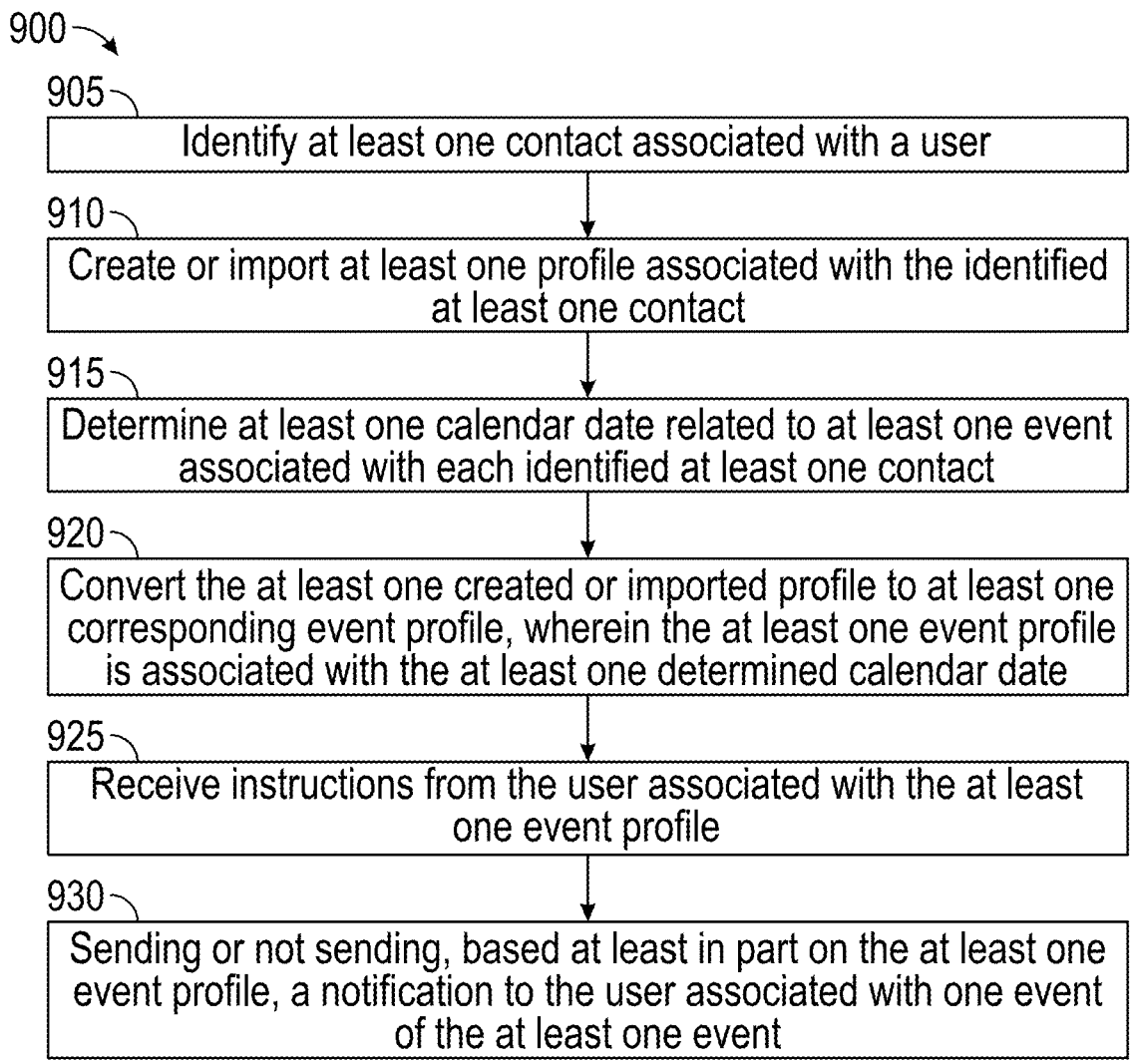
FIG. 9 shows a flow chart illustrating an example of a method in accordance with various aspects of this disclosure.

As shown in the flowchart in FIG. 9, one or methods for reminding of important events is described herein. One example method 900 may include, at step 905, identifying at least one contact associated with a user. The method 900 may also include, at step 910, creating or importing at least one profile associated with the identified at least one contact.

The method 900 may also include, at step 915, determining at least one calendar date related to at least one event associated with each identified at least one contact. The method 900 may also include, at step 920, converting the at least one created or imported profile to at least one corresponding event profile, wherein the at least one event profile is associated with the at least one determined calendar date.

The method 900 may also include, at step 925 receiving instructions from the user associated with the at least one event profile. The method 900 may also include, at step 930, sending or not sending, based at least in part on the at least one event profile, a notification to the user associated with one event of the at least one event.

One of more steps described here may be automated, and occur automatically, without additional actions required of a user. For example, the identifying at least one contact associated with a user may occur automatically, based on a backend database of enrolled users. In some embodiments, and as also described above, the backend database may be automatically compared with the contacts in a user's phone, by for example, matching a phone number saved locally in a user's phone with a phone number provided with another user at registrations. Other data may able be similarly matched, such as an email address, name, birthdate, or any other identifying information, or combination thereof.

Creating or importing at least one profile associated with the identified at least one contact, may also occur automatically, or with minimal actions required of a user. In some other examples, such automatic importing may have been authorized or preselected by the user. In some examples, the user may be presented with a list of matched profiles for approval prior to importing.

In some examples, determining at least one calendar date related to at least one event associated with each identified at least one contact may also occur automatically. In some examples, such determining may be based on information the identified contacts previously provided based on their registration. In some examples, such dates may be pulled from social media sites, etc.

In some examples, converting the at least one created or imported profile to at least one corresponding event profile may able occur automatically. In some embodiments, the receiving instructions from the user associated with the at least one event profile may have occurred at a previous time prior to the converting. For example, the user may have created or approved a rule applicable to later converting to event profiles, for all identified contacts.

In some examples, the sending a notification to the user associated with one event of the at least one event may not only occur automatically, but multiple different types of notifications may be sent to identified contacts. For example, one contact might automatically receive on email on a predetermined days, while the user might receive a push notification reminder to send another contact a text message, with the user's phone automatically opening up a text message with predetermined content, for the user to approve, potentially revise and personalize, and then send. In the way, a user may be enabled to better manage relationships according to different contact, and be able to remember and celebrate important dates with others.

Figure 10:
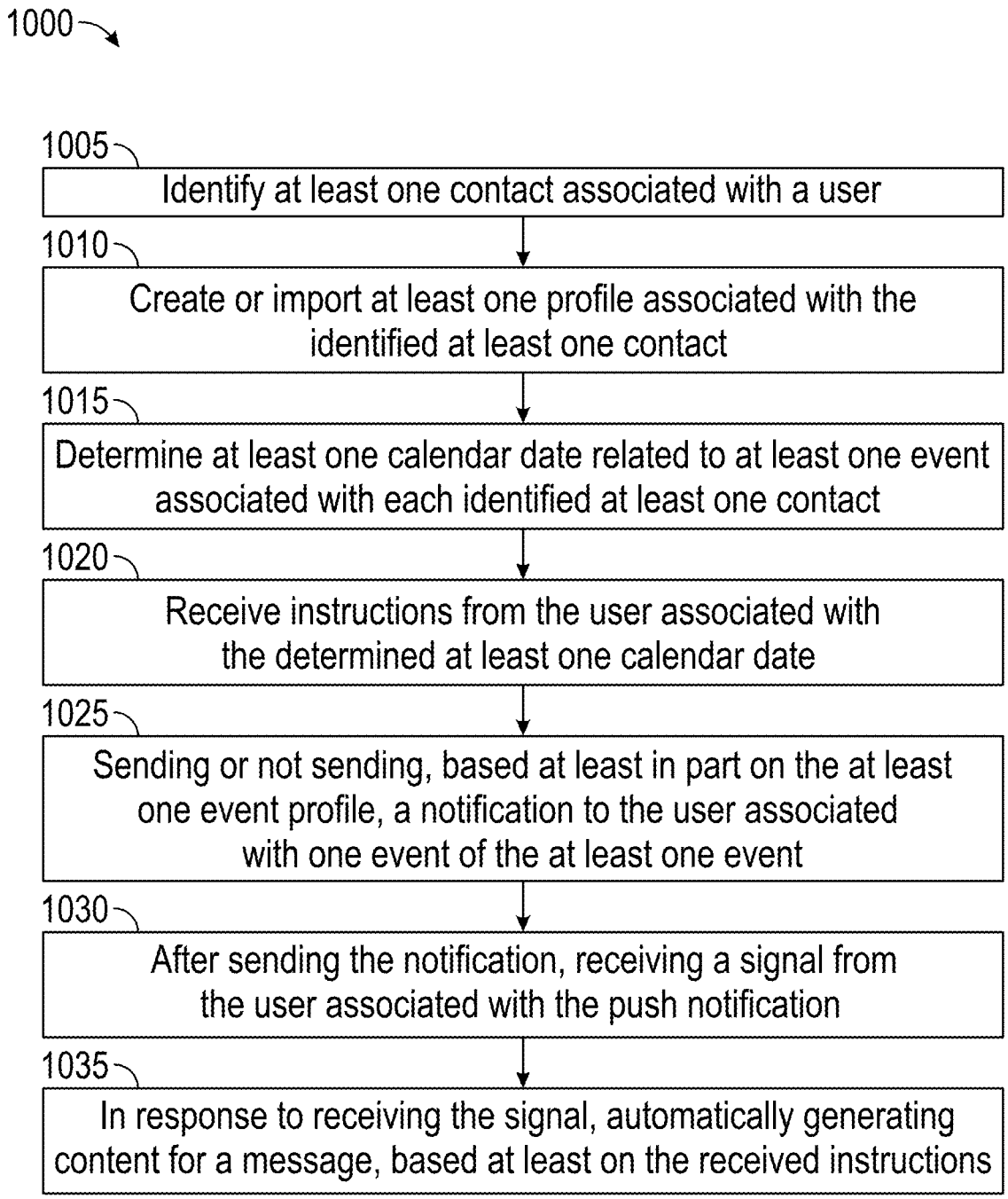
FIG. 10 shows a flow chart illustrating an example of a method in accordance with various aspects of this disclosure.

As shown in the flowchart in FIG. 10, another method for reminding of important events is described herein. One example method 1000 may include, at step 1005, identifying at least one contact associated with a user. The method 1000 may also include, at step 1010, creating or importing at least one profile associated with the identified at least one contact.

The method 1000 may also include, at step 1015, determining at least one calendar date related to at least one event associated with each identified at least one contact. The method 1000 may also include, at step 1020, receiving instructions from the user associated with the determined at least one calendar date.

The method 1000 may also include, at step 1025, sending or not sending, based at least in part on the instructions, a notification to the user. In some examples, the notification may include a reminder associated with one event of the at least one event. In some embodiments, the notification may include a push notification to a mobile phone of the user.

The method 1000 may also include, at step 1030, after sending the notification, receiving a signal from the user associated with the push notification. The method 1000 may also include, at step 1035, in response to receiving the signal, automatically generating content for a message. In some examples, the automatically generated content is predetermined based at least on the received instructions. And in some embodiments, the automatically generated predetermined content is editable by the user.

Figure 11:
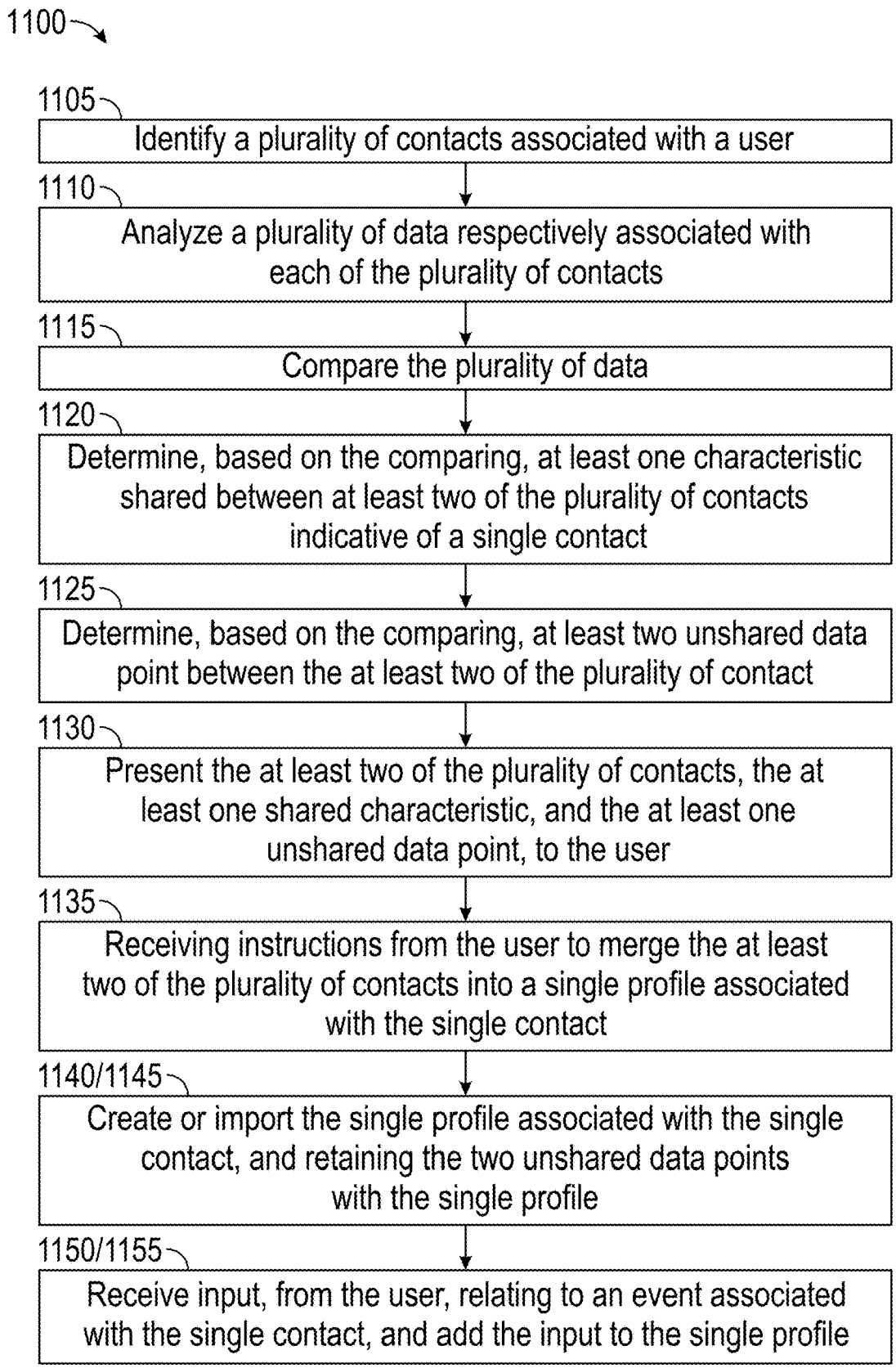
FIG. 11 shows a flow chart illustrating an example of a method in accordance with various aspects of this disclosure.

As shown in the flowchart in FIG. 11, a method for importing contacts into an event planning software application is described herein. One example method 1100 may include, at step 1105, identifying a plurality of contacts associated with a user. In some embodiments, the plurality of contacts may be received from a database associated with the user's mobile device (e.g., a cellular phone), and the identifying may be based on or include such receiving.

The method 1100 may also include, at step 1110, analyzing a plurality of data respectively associated with each of the plurality of contacts. In some embodiments, the analyzing may include, or the method 1100 may also include a step 1115 of, comparing the plurality of data. The method 1100 may also include a step 1120 of determining, based on the comparing, at least one characteristic shared between at least two of the plurality of contacts indicative of a single contact. In some examples, the at least one shared characteristic may include or be at least part of a name (e.g., a first name and/or last name) that is similar or identical.

The method 1100 may also include a step 1125 of determining, based on the comparing, at least two unshared data point between the at least two of the plurality of contacts. In some examples, the at least two unshared data point includes a communication mode, such as a phone number and an email address.

The method 1100 may also include, at step 1130, presenting the at least two of the plurality of contacts, the at least one shared characteristic, and the at least one unshared data point, to the user. In some examples, the presenting may be displayed through a graphical user interface through the user's mobile device. The method 1100 may also include, at step 1135, receiving instructions from the user to merge the at least two of the plurality of contacts into a single profile associated with the single contact.

The method 1100 may also include, at step 1140, creating or importing the single profile associated with the single contact. The method 1100 may also include, at step 1145 retaining the two unshared data points with the single profile. The method 1100 may also include, at step 1150, receiving input, from the user, relating to an event associated with the single contact. The method 1100 may also include, at step 1155, adding the input to the single profile. The method 1100 may also include, at step 1155, performing an action using at least one of the two unshared datapoints relating to the event.

Figure 12:
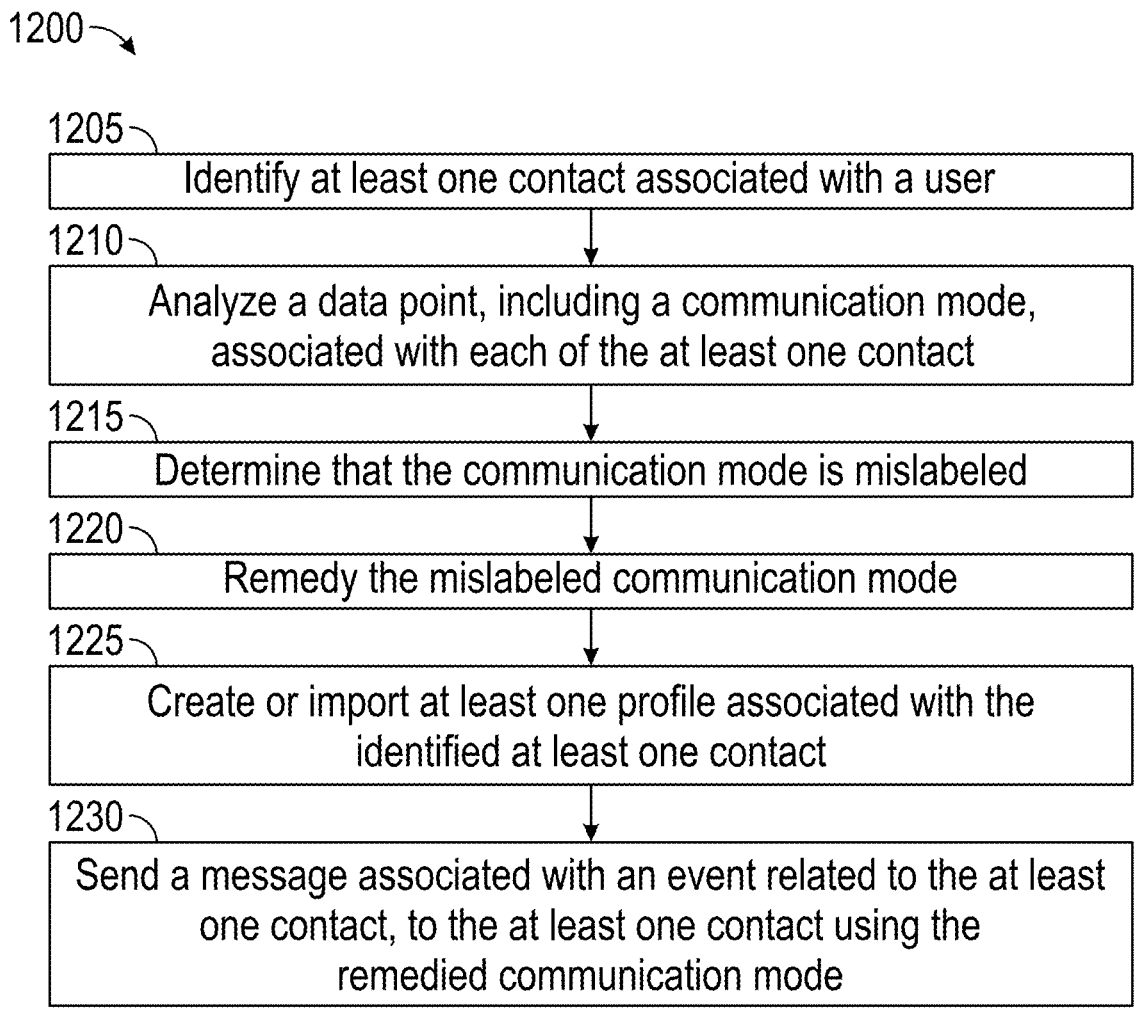
FIG. 12 shows a flow chart illustrating an example of a method in accordance with various aspects of this disclosure.

As shown in the flowchart in FIG. 12, a method for discovering and remedying erroneous mobile contact information is described herein. The remedying may occur prior to importing such contact information into an event planning software application. The method 1200 may also include, at step 1205, identifying at least one contact associated with a user. In some embodiments, the at least one contact may be received from a database associated with the user's mobile device (e.g., a cellular phone), and the identifying may be based on or include such receiving.

The method 1200 may also include, at step 1210, analyzing a data point associated with each of the at least one contact. In some examples, the data point includes a communication mode, such as a phone number.

The method 1200 may also include, at step 1215, determining that the communication mode is mislabeled. In some examples, the determining may include determining that the communication mode is probably mislabeled. In some examples, the mislabeling may make the communication mode inadequate for or incapable of a communication type. In some examples, the communication mode may be a mobile phone or a home phone, and a communication type is sending an SMS message. Accordingly, in some examples it may be determined that a phone number of a contact is has been mislabeled as a home phone when it is really a mobile phone.

The method 1200 may also include, at step 1220, remedying the mislabeled communication mode. In some examples, this may include, or occur prior to a step 1225 of, creating or importing at least one profile associated with the identified at least one contact, which profile includes a correctly labeled communication mode. In some examples, the remedying may include creating or importing at least one profile associated with the identified at least one contact that permits ignoring the mislabeled communication mode.

The method 1200 may also include, at step 1230, sending a message to the at least one contact using the remedied communication mode. In some examples, the message may be associated with an event related to the at least one contact.

The operations and functions described herein may be applied or performed by a computer system or device. For example, described herein is also a system and/or device for reminding of important events and an (in some embodiments) automated system of sending notifications associated with the same. In some examples, the system may include or device may be or include a computer system having a hardware processor and a physical memory using executable instructions that, as a result of being executed by the hardware processor, cause the computer system to perform certain operations.

In some system embodiments, the executable instructions, as a result of being executed by the hardware processor, may cause the computer system to identify, by the hardware processor (or at least in part via the hardware), at least one contact associated with a user. In some system embodiments, the executable instructions, as a result of being executed by the hardware processor, may cause the computer system to create or import at least one profile associated with the identified at least one contact.

In some system embodiments, the executable instructions, as a result of being executed by the hardware processor, may cause the computer system to determine at least one calendar date related to at least one event associated with each identified at least one contact. In some system embodiments, the executable instructions, as a result of being executed by the hardware processor, may cause the computer system to convert the at least one created or imported profile to at least one corresponding event profile, wherein the at least one event profile is associated with the at least one determined calendar date. In some system embodiments, the executable instructions, as a result of being executed by the hardware processor, may cause the computer system and/or device to receive instructions from the user associated with the at least one event profile. In some system and/or device embodiments, the executable instructions, as a result of being executed by the hardware processor, may cause the computer system to send or not send, based at least in part on the at least one event profile, a notification to the user associated with one event of the at least one event. In some system embodiments, the executable instructions, as a result of being executed by the hardware processor, may cause the computer system and/or device to perform other operations and/or method steps described here, including any combination and any order thereof.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Some aspects of the disclosure may involve computer-readable media. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A computer-implemented method for reminding of important events, including:
   identifying at least one contact associated with a user;
   creating or importing at least one profile associated with the identified at least one contact;
   determining at least one calendar date related to at least one event associated with each identified at least one contact;
   receiving instructions from the user associated with the determined at least one calendar date;

sending or not sending, based at least in part on the instructions, a notification to the user, wherein the notification comprises a reminder associated with one event of the at least one event, and wherein the notification comprises a push notification to a mobile phone of the user;

after sending the notification, receiving a signal from the user associated with the push notification; and in response to receiving the signal, automatically generating content for a message, wherein the automatically generated content is predetermined based at least on the received instructions, and wherein the automatically generated predetermined content is editable by the user.

2. The method of claim 1, wherein the notification is configured to remind the user of the one event.

3. The method of claim 1, wherein the instructions from the user are to send the notification in a manner according to at least one preference of the user.

4. The method of claim 3, wherein the message is distinct from the notification.

5. The method of claim 4, wherein the sending the message is based at least in part on the notification and the message is associated with the automatically generated predetermined content editable by the user.

6. The method of claim 5, wherein the sending the notification to the user and the sending the message to the first contact are enabled within a same mobile application.

7. The method of claim 1, wherein at least one-of the created or imported at least one profile is imported from a list of contacts in a database of a mobile phone of the user.

8. The method of claim 1, further comprising sending the message to a first contact through a separate interface, wherein the first contact is a first contact of the identified at least one contact.

9. The method of claim 8, wherein the message to the first contact comprises at least one of a message associated with a social media platform and a text or short message service (SMS) message.

10. A non-transitory, computer-readable medium for integration of an embedded-process communication, having stored thereon executable instructions that, as a result of being executed by one or more processors of a computer system, cause the computer system to at least:

identify at least one contact associated with a user;

create or import at least one profile associated with the identified at least one contact;

determine at least one calendar date related to at least one event associated with each identified at least one contact;

receive instructions from the user associated with the determined at least one calendar date;

send or not send, based at least in part on the instructions, a notification to the user, wherein the notification comprises a reminder associated with one event of the at least one event, and wherein the notification comprises a push notification to a mobile phone of the user;

after sending the notification, receive a signal from the user associated with the push notification; and in response to receiving the signal, automatically generate content for a message, wherein the automatically generated content is predetermined based at least on the received instructions, and wherein the automatically generated predetermined content is editable by the user.

11. The non-transitory computer-readable medium of claim 10, wherein the notification is configured to remind the user of the one event.

12. The non-transitory computer-readable medium of claim 10, wherein the instructions from the user are to send the notification in a manner according to at least one preference of the user.

13. The non-transitory computer-readable medium of claim 10, wherein the message is distinct from the notification.

14. The non-transitory computer-readable medium of claim 13, wherein the executable instructions that, as a result of being executed by the one or more processors, cause the computer system to send the message are based at least in part on the notification, and the message is associated with the automatically generated predetermined content editable by the user.

15. The non-transitory computer-readable medium of claim 14, wherein the executable instructions that, as a result of being executed by the one or more processors, cause the computer system to send the notification to the user and send the message to the first contact, further comprise instructions that cause the computer system to:

enable the sending the notification to the user and the sending the message to the first contact within a same mobile application.

16. The non-transitory computer-readable medium of claim 10, wherein the executable instructions further comprise instructions that, as a result of being executed by the one or more processors, cause the computer system to import at least one of the created or imported at least one profile from a list of contacts in a database of a mobile phone of the user.

17. The non-transitory computer-readable medium of claim 10, wherein the executable instructions further comprise instructions that, as a result of being executed by the one or more processors, cause the computer system to:

send the message to a first contact through a separate interface, wherein the first contact is a first contact of the identified at least one contact.

18. The method of claim 17, wherein the message to the first contact comprises at least one of a message associated with a social media platform and a text or short message service (SMS) message.

19. A device for reminding of important events, comprising:

a processor; and a memory in electronic communication with the processor, the memory embodying instructions, the instructions being executable by the processor to:

identify at least one contact associated with a user;

create or import at least one profile associated with the identified at least one contact;

determine at least one calendar date related to at least one event associated with each identified at least one contact;

receive instructions from the user associated with the determined at least one calendar date;

send or not send, based at least in part on the instructions, a notification to the user, wherein the notification comprises a reminder associated with one event of the at least one event, and wherein the notification comprises a push notification to a mobile phone of the user;

after sending the notification, receive a signal from the user associated with the push notification; and in response to receiving the signal, automatically generate content for a message, wherein the automatically generated content is predetermined based at least on the received instructions, and wherein the automatically generated predetermined content is editable by the user.

* * * * *